United States Patent [19]
Lee, Jr.

[11] 4,143,095
[45] Mar. 6, 1979

[54] POLYPHENYLENE ETHER RESIN COMPOSITIONS CONTAINING A HYDROGENATED ELASTOMERIC BLOCK COPOLYMER

[75] Inventor: Gim F. Lee, Jr., Albany, N.Y.

[73] Assignee: General Electric Company, Pittsfield, Mass.

[21] Appl. No.: 838,373

[22] Filed: Sep. 30, 1977

[51] Int. Cl.$^2$ ............................ C08L 9/00; C08L 9/06
[52] U.S. Cl. .................................. 260/874; 260/42.18; 528/212; 528/213
[58] Field of Search ................ 260/874, 47 ET, 42.18; 528/212, 213

[56] References Cited

U.S. PATENT DOCUMENTS

| 3,981,841 | 9/1976 | Abolins et al. ..................... 260/42.18 |
| 3,983,090 | 9/1976 | Abolins et al. ..................... 260/42.18 |

*Primary Examiner*—Lester L. Lee
*Attorney, Agent, or Firm*—Morgan, Finnegan, Pine, Foley & Lee

[57] ABSTRACT

Novel thermoplastic compositions are disclosed which include a polyphenylene ether resin, an alkenyl aromatic resin modified with an EPDM rubber, and a selectively hydrogenated elastomeric block copolymer. Also included within the scope of this invention are reinforced and flame-retardant compositions of said thermoplastic materials.

32 Claims, No Drawings

POLYPHENYLENE ETHER RESIN COMPOSITIONS CONTAINING A HYDROGENATED ELASTOMERIC BLOCK COPOLYMER

This invention relates to compositions of a polyphenylene ether resin, an alkenyl aromatic resin that is modified with an EPDM rubber, and a selectively hydrogenated elastomeric block copolymer. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. No. 3,337,499; Blanchard et al., U.S. Pat. No. 3,219,626; Laakso et al., U.S. Pat. No. 3,342,892; Borman, U.S. Pat. No. 3,344,116; Hori et al., U.S. Pat. No. 3,384,619; Faurote et al., U.S. Pat. No. 3,440,217; and disclosures relating to metal based catalysts which do not include amines, are known from patents such as Wieden et al., U.S. Pat. No. 3,442,885 (copper-amidines); Nakashio et al., U.S. Pat. No. 3,573,257 (metal-alcoholate or -phenolate); Kobayashi et al., U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al., U.S. Pat. No. 3,382,212. Cizek, U.S Pat. No. 3,383,435 discloses polyphenylene ether-styrene resin compositions. All of the above-mentioned disclosures are incorporated herein by reference.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers is improved.

Nakashio et al. U.S. Pat. No. 3,658,945 discloses that from 0.5 to 15% by weight of an EPDM-modified styrene resin may be used to upgrade the impact strength of polyphenylene ether resins. In Cooper et al., U.S. Pat. No. 3,943,191 it is disclosed that when the highly unsaturated rubber used in compositions of the type disclosed by Cizek, is replaced with EPDM rubber that has a low degree of residual unsaturation, the thermal oxidative stability and color stability are improved. The disclosures of the Nakashio et al. and Cooper et al. patents are incorporated herein by reference.

The impact strength of the Cooper et al. compositions is superior to that of a polyphenylene ether resin alone or that of similar compositions comprised of unmodified polystyrene; however, the impact strength of the Cooper et al. compositions is inferior to that of similar compositions comprised of polystyrene modified with polybutadiene rubber, such as a composition known as FG-834, available from Foster-Grant Co.

As is disclosed in Abolins et al., U.S. Pat. No. 3,981,841, the impact strength of the Cooper et al. compositions can be improved by incorporating therein impact modifiers such as an emulsion-grafted EPDM polystyrene copolymer.

It has now been found that a composition of a polyphenylene ether resin, an alkenyl aromatic resin modified with an EPDM rubber, and a selectively hydrogenated elastomeric block copolymer is a very useful thermoplastic molding material having good thermal oxidative stability and good impact strength.

It is, therefore, a primary object of this invention to provide improved compositions that are based on polyphenylene ether resins, modified alkenyl aromatic resins, and selectively hydrogenated elastomeric block copolymers.

Another object of this invention is to provide molding compositions and molded articles that are based on a polyphenylene ether resin and an EPDM-modified alkenyl aromatic resin and that have improved thermal oxidative stability.

Still another object of this invention is to provide molding compositions and molded articles that are based on a polyphenylene ether resin, an EPDM-modified alkenyl aromatic resin, a selectively hydrogenated elastomeric block copolymer and that have improved impact strength.

It is also an object of this invention to provide the above-described, improved molding compositions in reinforced and/or flame-retardant embodiments.

DESCRIPTION OF THE INVENTION

The above-mentioned advantages and objects and others will be readily apparent to those skilled in the art by the following compositions.

Preferred types will include thermoplastic compositions which comprise:

(a) from 20 to 90% by weight of a polyphenylene ether resin;

(b) from 10 to 80% by weight of an alkenyl aromatic resin that is modified with an EPDM rubber, that is, a rubbery interpolymer comprising a mixture of mono-olefins and a polyene; and (c) from 1 to 20% by weight of a selectively hydrogenated elastomeric block copolymer of the A-B-A type, wherein A is a polymerized vinyl aromatic hydrocarbon and center block B is a polymerized conjugated diene.

The preferred polyphenylene ethers are of the formula

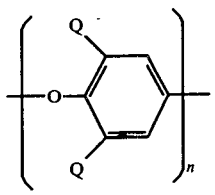

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl1,4-phenylene) ether.

The alkenyl aromatic resin should have at least 25% of its units derived from an alkenyl aromatic monomer of the formula

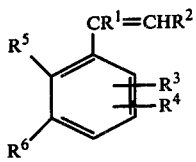

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, bromostyrene, chlorostyrene, α-methylstyrene, vinylxylene, divinylbenzene, vinyl naphthalene, and vinyl-toluene.

The alkenyl aromatic monomer may be copolymerized with materials such as those having the general formula

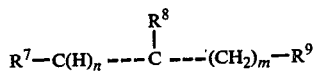

wherein the dotted lines each represent a single or a double carbon to carbon bond; $R^7$ and $R^8$ taken together represent a

linkage; $R^9$ is selected from the group consisting of hydrogen, vinyl, alkyl of from 1 to 12 carbon atoms, alkenyl of from 1 to 12 carbon atoms, alkylcarboxylic of from 1 to 12 carbon atoms, and alkenylcarboxylic of from 1 to 12 carbon atoms; n is 1 or 2, depending on the position of the carboncarbon double bond; and m is an integer of from 0 to about 10. Examples include maleic anhydride, citraconic anhydride, itaconic anhydride, aconitic anhydride, and the like.

The alkenyl aromatic resins include, by way of example, homopolymers such as homopolystyrene and monochloropolystyrene, and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene-acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. Nos. 2,971,939, 3,336,267, and 2,769,804, all of which are incorporated herein by reference.

The useful EPDM rubbers include those prepared from ethylene, an alpha-olefin, and a polyene. Preferred types comprise 10–90 mole percent of ethylene, 10–90 mole percent of an alpha-olefin containing 3–16 carbon atoms, and 0.1–12 mole percent of a polyene that is a non-conjugated cyclic or open-chain diene having 5–20 carbon atoms. Especially preferred are those alpha-olefins having 3–10 carbon atoms and nonconjugated cyclic or open-chain dienes having 5–10 carbon atoms.

Useful EPDM rubbers also include the ethylene-propylene-ethylidene norbornene terpolymer and those described in Ritchie, *Vinyl and Allied Polymer*, Vol. 1, Page 121 (1968), which is incorporated herein by reference. Preferred EPDM rubbery interpolymers are those comprised of ethylene, propylene, and 5-ethylidene-2-norbornene; of ethylene, propylene, and 1,4-hexadiene; and of ethylene, propylene, and dicyclopentadiene. Preferred modified alkenyl aromatic resins will include from about 4 to about 25% by weight of rubbery interpolymer.

The alkenyl aromatic resin modified with an EPDM rubber may be prepared by dissolving the rubbery interpolymer in the alkenyl aromatic monomer and polymerizing the mixture, preferably in the presence of a free-radical initiator, until 90–100% by weight of the alkenyl aromatic monomer has reacted to form said EPDM-modified alkenyl aromatic resin.

In the selectively hydrogenated elastomeric block copolymers of the A-B-A type, the terminal blocks A represent polymerized monomers of Formula II above. Center block B represents a polymerized conjugated diene of at least four carbon atoms, preferably selected from the group consisting of 1,3-butadiene, 2-methyl-1,3-butadiene, 2,3-dimethyl-1,3-butadiene, and 1,3-pentadiene. The preferred A-B-A block copolymers are the styrene-butadiene-styrene block copolymers having 60 to 90 parts by weight of styrene to 100 parts by weight of butadiene.

The elastomeric A-B-A block copolymers useful in this invention are selectively hydrogenated in that only the center block B is hydrogenated. For example, in such styrene-butadienestyrene block copolymers only the center blocks, butadiene, but not the terminal blocks, styrene, have been hydrogenated.

The ratios of the polymerized monomers can vary broadly, so long as the molecular weight of the center block is greater than the combined molecular weights of the terminal blocks. Preferably, within this limitation, the molecular weight of each terminal block will range from about 4,000 to about 115,000 and that of the center block will range from about 20,000 to about 450,000.

Unhydrogenated block copolymers can be prepared by an organometallic initiation process using, for example, sodium or lithium metal or an organic derivative thereof. The diene monomers can be polymerized with a monofunctional or difunctional initiator, as is described in detail in "Polymer Chemistry of Synthetic Elastomers", edited by Kennedy et al., Interscience Publishers, Vol. 23, Part II (1969), pages 553–559, incorporated herein by reference.

Other methods of preparation are described in Zelinski, U.S. Pat. No. 3,251,905 and Holden et al., U.S. Pat. No. 3,231,635, the disclosures of which are incorporated herein by reference.

Selective hydrogenation may be conducted using a variety of hydrogenation catalysts, e.g., nickel, Raney nickel, copper chromate, molybdenum sulfide, finely divided platinum, etc., on a low surface area carrier. The hydrogenation can be carried out at any desired temperature or pressure, from atmospheric to about 3,000 p.s.i.g., the usual range being between about 100 and 1,000 p.s.i.g., at temperatures of from about 75° to 600° F., for a period of time ranging from about 0.1 to 24 hours, preferably about 0.2 to 8 hours. The preparation of hydrogenated block copolymers is described in detail in Jones, U.S. Pat. No. 3,431,323, the disclosure of which is incorporated herein by reference.

Preferably the average unsaturation of center block B in the A-B-A type block copolymers is reduced to less than about 20% of its original value.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a), (b), and (c) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005" and 0.125".

It is also a feature of this invention to provide flame-retardant thermoplastic compositions, as defined above, by modifying the composition to include a flame-retardant additive in a minor proportion but in an amount at least sufficient to render the composition non-burning or self-extinguishing. Such flame-retardant compositions include a halogenated organic compound, a halogenated organic compound in admixture with an antimony compound, elemental phosphorus, a phosphorus compound, compounds containing phosphorus-nitrogen bond, or a mixture of two or more of the foregoing.

When used herein, the terms "non-burning", "self-extinguishing", and "non-dripping" are used to describe compositions which meet the standards of ASTM test method D-635 and Underwriters' laboratories Bulletin No. 94. Another recognized procedure to determine flame resistance of resinous compositions is the Oxygen Index Test or LOI (Limiting Oxygen Index). This test is a direct measure of a product's combustibility based on the oxygen content of the combustion atmosphere. Appropriate specimens are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame-retardant additives in the specified amounts have a substantially higher oxygen index and thus are much less combustible than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor porportion based on the polyphenylene ether-modified alkenyl aromatic polymer compostion—major proportions will detract from physical properties—but at least sufficient to render the composition non-burning or self-extinguishing. Those skilled in the art are well aware that the amount will vary with the nature of the polymers in the composition and with the efficiency of the additive. In general, however, the amount of additive will be from about 0.5 to 50 parts by weight per hundred parts of components (a), (b), and (c). A preferred range will be from about 1 to 25 parts, and an especially preferred range will be from about 3 to 15 parts of additive per hundred parts of (a), (b), and (c). Smaller amounts of compounds highly concentrated in the elements responsible for flame retardance will be sufficient, e.g., elemental red phosphorus will be preferred at about 0.5 to 10 parts by weight per hundred parts of (a), (b), and (c), while phosphorus in the form of triphenyl phosphate will be used at about 3 to 25 parts of phosphate per hundred parts of (a), (b), and (c), and so forth. Halogenated aromatics will be used at about 2 to 20 parts and synergists, e.g., antimony oxide, will be used at about 1 to 10 parts by weight per hundred parts of components (a), (b), and (c).

Among the useful halogen-containing compounds are those of the formula

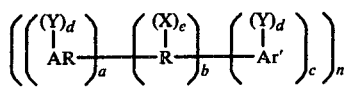

IV wherein n is 1 to 300 and R is an alkylene, alkylidene, or cycloaliphatic linkage, e.g., methylene, ethylene, propylene, isopropylene, isopropylidene, butylene, isobutylene, amylene, cyclohexylene, cyclopentylidene, and the like; or a linkage selected from the group consisting of ether; carbonyl; amine; a sulfur-containing linkage, e.g., sulfide, sulfoxide, or sulfone; carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. Nos. 3,647,747 and 3,334,154, both of which are incorporated herein by reference.

Ar and Ar' are mono- or polycarbocyclic aromatic groups such as phenylene, biphenylene, terphenylene, naphthylene, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., said substituents being essentially inert provided there be at least one and preferably two halogen atoms per aryl, e.g., phenyl, nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0, and when b is 0, either a or c, but not both, may be 0. Where b is 0, the aromatic groups are joined by a direct carbon-carbon bond.

The hydroxyl and Y substituents on the aromatic groups, Ar and Ar', can be varied in the ortho, meta, or para positions on the aromatic rings, and the groups can be in any possible geometric relationship with respect to one another.

Included within the scope of the above formula are di-aromatics of which the following are representative:

2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl 2,4'-dibromobiphenyl, 2,4'-dichlorobiphenyl, hexbromobiphenyl, octabromobiphenyl, decabromobiphenyl, and halogenated diphenyl ethers containing from 2 to 10 carbon atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone, or mixed with antimony oxide.

In general, the preferred phosphate compounds are selected from the group of elemental phosphorus and organic phosphonic acids, phosphonates, phosphinates, phosphonites, phosphinites, phosphine oxides, phosphines, phosphites, and phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

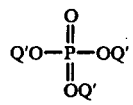

and nitrogen analogs thereof where each Q' represents the same or different radicals including hydrocarbon radicals such as alkyl, cycloalkyl, aryl, alkyl substituted aryl, and aryl substituted alkyl; halogen; hydrogen; and combinations thereof provided that at least one said Q' is aryl. Typical examples of suitable phosphates include phenylbisdodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl) phosphate, diphenyl hydrogen phosphate, bis-(2-ethylhexyl) p-tolyphosphate, tritolyl phosphate, bis-(2-ethylhexyl)-phenyl phosphate, tri(nonylphenyl) phosphate, phenylmethyl hydrogen phosphate di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q'is aryl. The most preferred phosphate is triphenyl phosphate. It is also preferred to use triphenyl phosphate in combination with hexabromobenzene and, optionally, antimony oxide. Especially preferred is a composition comprised of mixed triaryl phosphates, with one or more isopropyl groups on some or all of the aryl rings, such as Kronitex 50 supplied by Food Machinery Corporation.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide, or tetrakis (hydroxymethyl) phosphonium chloride. These flame-retardant additives are commercially available.

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., ⅛" to 1" in length, and preferably less than ¼" in length and put into an extrusion compounder with (a) the polyphenylene ether resin, (b) the alkenyl aromatic resin that is modified with a rubbery interpolymer of a mixture of mono-olefins and a polyene, (c) the selectively hydrogenated elastomeric block copolymer, and (d) the flame-retardant additive(s), to produce molding pellets. The fibers are shortened and predispersed in the process, coming out at less than 1/16" long. In another procedure, glass filaments are ground or milled to short lengths, are mixed with the polyphenylene ether resin, the modified alkenyl aromatic polymer and, optionally, flame-retardant additive, by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLES I AND II

Compositions comprised of poly(2,6-dimethyl-1,4-phenylene)ether resin and Taflite 925-01, an EPDM-modified polystyrene commercially available from Mitsui-Toatsu, were prepared and injection molded at 550° F. (mold temperature 180° F.), and evaluated for mechanical properties. Similar compositions additionally comprised of a selectively hydrogenated styrenebutadiene-styrene block copolymer known as Kraton G 6521, supplied by Shell Chemical Co., were also prepared. The formulations and test results are shown in the following table:

TABLE 1.

| EXAMPLE | C-1* | I | C-2* | II |
|---|---|---|---|---|
| Composition (parts by weight) | | | | |
| poly(2,6-dimethyl-1,4-phenylene ether) resin | 35 | 35 | 50 | 50 |
| Taflite 925-01 | 65 | 50 | 50 | 35 |
| Kraton G 6521 | — | 15 | — | 15 |
| Properties | | | | |
| Tensile yield, psi × 10⁻³ | 8.86 | 6.14 | 11.04 | 7.22 |
| Tensile elongation, % | 71 | 50 | 50 | 22 |
| Izod impact strength, ft.lbs/in. notch | 1.5 | 7.6 | 1.7 | 9.3 |
| Gardner impact strength, in.lbs. | <10 | 181 | <10 | 183 |

*Control

It can be seen from the above that compositions comprised of polyphenylene ether resin, an EPDM-modified alkenyl aromatic resin, and a selectively hydrogenated elastomeric block copolymer show a dramatic increase in impact strength as compared to similar compositions not having the hydrogenated elastomeric block copolymer.

Obviously, other modifications and variations of the present invention are possible in the light of the above teachings. It is, therefore, to be understood that changes may be made in the particular embodiments described above which are within the full intended scope of the invention as defined in the appended claims.

I claim:

1. A thermoplastic composition which, after molding, has good impact resistance, said composition comprising:
   (a) a polyphenylene ether resin;
   (b) an alkenyl aromatic resin that is modified with a rubbery interpolymer of a mixture of mono-olefins and a polyene, by polymerizing an alkenyl aromatic monomer in the presence of the rubbery interpolymer; and
   (c) a selectively hydrogenated elastomeric block copolymer of the A-B-A type, wherein terminal blocks A are a polymerized vinyl aromatic hydrocarbon and center block B is a polymerized conjugated diene.

2. The composition of claim 1 wherein the alkenyl aromatic resin is modified with a rubbery interpolymer of ethylene, an alpha-olefin, and a polyene.

3. The composition of claim 2 wherein the alpha-olefin is propylene.

4. The molding composition of claim 1 wherein said rubbery interpolymer comprises 10–90 mole percent of ethylene, 10–90 mole percent of an alpha-olefin having 3–16 carbon atoms, and 0.1–12 mole percent of a polyene that is a non-conjugated cyclic or open-chain diene having 5–20 carbon atoms.

5. The molding composition of claim 4 wherein the alpha-olefin is propylene.

6. The molding composition of claim 4 wherein the polyphenylene ether resin is selected from the compounds of the formula

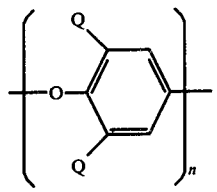

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

7. The molding composition of claim 1 wherein the alkenyl aromatic resin is prepared from a monomer selected from the group consisting of styrene, α-methylstyrene, bromostyrene, chlorostyrene, divinylbenzene, and vinyltoluene.

8. The composition of claim 1 wherein in the A-B-A block copolymer (c), the vinyl aromatic hydrocarbon of terminal blocks A is selected from the group consisting of styrene, α-methyl styrene, vinyltoluene, vinyl xylene, and vinyl naphthalene and the conjugated diene of center block B is selected from the group consisting of butadiene, 2-methyl-1,3-butadiene, 1,3-pentadiene, and 2,3-dimethylbutadiene.

9. The composition of claim 1 wherein in A-B-A block copolymer (c), each of terminal blocks A has an average molecular weight of from about 4,000 to about 115,000 and center block B has an average molecular weight of from about 20,000 to about 450,000.

10. The composition of claim 1 wherein the average unsaturation of center block B has been reduced to less than 20% of its original value.

11. The composition of claim 1 wherein said composition includes a reinforcing amount of an inorganic reinforcing filler.

12. The composition of claim 11 wherein said composition includes 10–80% weight of fibrous glass filaments, based on the total weight of the composition.

13. The composition of claim 1 wherein said composition includes a flame-retardant amount of a flame-retardant additive.

14. The molding composition of claim 13 wherein said flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

15. A thermoplastic composition which, after molding has good impact strength, said composition comprising:
   (a) from 20 to 90% by weight of a polyphenylene ether resin;
   (b) from 10 to 80% by weight of an alkenyl aromatic resin that is modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms, by polymerizing an alkenyl aromatic monomer in the presence of the rubber interpolymer; and
   (c) from about 1 to 20% by weight of a selectively hydrogenated elastomeric block copolymer of the A-B-A type, wherein terminal blocks A are polymerized vinyl aromatic hydrocarbons and center block B is a polymerized conjugated diene.

16. The composition of claim 15 wherein said polyphenylene ether resin is poly (2,6-dimethyl-1,4-phenylene) ether.

17. The composition of claim 15 wherein the alpha-olefin is propylene.

18. The composition of claim 15 wherein said alkenyl aromatic resin is styrene and said rubbery interpolymer is present between about 4% and about 25% by weight of styrene and rubbery interpolymer combined.

19. The composition of claim 15 wherein said rubbery interpolymer comprises 10–90 mole percent of ethylene, 10–90 mole percent of propylene, and 0.1–12 mole percent of 5-ethylidene-2-norbornene.

20. The molding composition of claim 15 wherein said rubbery interpolymer comprises 10–90 mole percent of ethylene, 10–90 mole percent of propylene, and 0.1–12 mole percent of 1,4-hexadiene.

21. The composition of claim 15 wherein said rubbery interpolymer comprises 10–90 mole percent of ethylene, 10–90 mole percent of propylene, and 0.1–12 mole percent of dicyclopentadiene.

22. A thermoplastic composition which, after molding has good impact strength, said composition comprising:
   (a) from 20 to 65% by weight of a polyphenylene ether resin;

(b) from 35 to 80% by weight of an alkenyl aromatic resin that is modified with a rubbery interpolymer which comprises 10–90 mole percent of ethylene, 10–90 mole percent of alpha-olefin having 3–10 carbon atoms, and 0.1–12 mole percent of a polyene that is a non-conjugated cyclic or open-chain diene having 5–10 carbon atoms, by polymerizing an alkenyl aromatic monomer in the presence of the rubbery interpolymer;

(c) from about 1 to 20% by weight of a selectively hydrogenated elastomeric block copolymer of the A-B-A type, wherein the terminal blocks A are polymerized vinyl aromatic hydrocarbons and center block B is a polymerized conjugated diene; and (d) a reinforcing amount of an inorganic reinforcing filler.

23. The composition of claim 22 wherein said polyphenylene ether resin is poly(2,6-dimethyl-1,4phenylene) ether.

24. The composition of claim 22 wherein the alpha-olefin is propylene.

25. The composition of claim 22 wherein said reinforcing filler comprises from 10 to 80% of fibrous glass filaments, based on the total weight of the composition.

26. A thermoplastic composition which, after molding, has good impact strength, said composition comprising:

(a) from 20 to 65% by weight of a polyphenylene ether resin;

(b) from 35 to 80% by weight of an alkenyl aromatic resin that is modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms, by polymerizing an alkenyl aromatic monomer in the presence of the rubbery interpolymer;

(c) from about 1 to 20% by weight of a selectively hydrogenated elastomeric block copolymer of the A-B-A type, wherein terminal blocks A are polymerized vinyl aromatic hydrocarbons and center block B is a polymerized conjugated diene; and (d) a flame-retardant amount of a flame-retardant additive.

27. The composition of claim 26 wherein said alpha-olefin is propylene.

28. The composition of claim 26 wherein said flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

29. The molding composition of claim 26 wherein said flame-retardant additive comprises a mixture of an organic bromine-containing compound with antimony oxide.

30. The composition of claim 26 wherein said flame-retardant additive is triphenylphosphate.

31. The composition of claim 26 wherein said flame-retardant additive is comprised of a mixture of triaryl phosphates wherein one or more aryl groups are substituted by one or more isopropyl groups.

32. A thermoplastic composition which, after molding, has good impact resistance, said composition comprising:

(a) from 20 to 90% by weight of a polyphenylene ether resin;

(b) from 10 to 80% by weight of an alkenyl aromatic resin that is modified with rubbery interpolymer of a mixture of mono-olefins and a polyene, by polymerizing an alkenyl aromatic monomer in the presence of the rubbery interpolymer; and (c) from about 1 to 20% by weight of a selectively hydrogenated elastomeric block copolymer of the A-B-A type, wherein terminal blocks A are polymerized vinyl aromatic hydrocarbon and center block B is a polymerized conjugated diene.

* * * * *

UNITED STATES PATENT AND TRADEMARK OFFICE
CERTIFICATE OF CORRECTION

PATENT NO. : 4,143,095
DATED : March 6, 1979
INVENTOR(S) : Gim F. Lee, Jr.

It is certified that error appears in the above-identified patent and that said Letters Patent are hereby corrected as shown below:

Column 3, line 24, "poly(2,6-dimethyl1,4-phenylene)ether" should read --poly(2,6-dimethyl-1,4-phenylene)ether--.

Column 4, line 2, "carboncarbon" should read --carbon-carbon--

Column 4, line 64, "styrene-butadienestyrene" should read --styrene-butadiene-styrene--.

Column 6, line 46, "laboratories" should read --Laboratories--.

Column 9, line 40, insert "," after "phosphate", first occurrence.

Column 10, line 37, "styrenebutadi-" should read --styrene-butadi- --.

UNITED STATES PATENT AND TRADEMARK OFFICE
CERTIFICATE OF CORRECTION

PATENT NO. : 4,143,095
DATED : March 6, 1979
INVENTOR(S) : Gim F. Lee, Jr.

It is certified that error appears in the above-identified patent and that said Letters Patent are hereby corrected as shown below:

Column 12, line 12, insert --by-- before "weight".

Column 12, line 37, "rubber" should read --rubbery--.

Column 13, line 12, delete "the".

Signed and Sealed this

Thirtieth Day of October 1979

[SEAL]

Attest:

RUTH C. MASON
Attesting Officer

LUTRELLE F. PARKER
Acting Commissioner of Patents and Trademarks